(12) United States Patent
Oshiumi

(10) Patent No.: US 9,933,025 B2
(45) Date of Patent: Apr. 3, 2018

(54) CONTROL SYSTEM FOR CLUTCH

(71) Applicant: TOYOTA JIDOSHA KABUSHIKI KAISHA, Toyota-shi, Aichi-ken (JP)

(72) Inventor: Yasuhiro Oshiumi, Gotemba (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/310,528

(22) PCT Filed: May 12, 2015

(86) PCT No.: PCT/IB2015/000676
§ 371 (c)(1),
(2) Date: Nov. 11, 2016

(87) PCT Pub. No.: WO2015/173621
PCT Pub. Date: Nov. 19, 2015

(65) Prior Publication Data
US 2017/0089412 A1    Mar. 30, 2017

(30) Foreign Application Priority Data
May 14, 2014  (JP) ................................ 2014-100094

(51) Int. Cl.
*F16D 48/06* (2006.01)
*F16D 25/06* (2006.01)

(52) U.S. Cl.
CPC ........... *F16D 48/06* (2013.01); *F16D 25/06* (2013.01); *F16D 2500/1026* (2013.01);
(Continued)

(58) Field of Classification Search
CPC .................................. F16D 48/06; F16D 25/06
(Continued)

(56) References Cited

U.S. PATENT DOCUMENTS 2,105,429 A * 1/1938 Maybach ............... F16D 48/06
                                                    192/103 R
5,630,773 A * 5/1997 Slicker .................. F16D 48/066
                                                    477/175
(Continued)

FOREIGN PATENT DOCUMENTS

EP          0730105 A2    9/1996
JP        2005-291433 A   10/2005
(Continued)

OTHER PUBLICATIONS

Comparative analysis of DITC and DTFC of switched reluctance motor for EV applications; Deepak Ronanki; Sheldon S Williamson; 2017 IEEE International Conference on Industrial Technology (ICIT); Year: 2017; pp. 509-514.*

*Primary Examiner* — Cuong H Nguyen
(74) *Attorney, Agent, or Firm* — Andrews Kurth Kenyon LLP

(57) ABSTRACT

A control system is for a clutch mechanism. The clutch mechanism includes a first engaging element, a second engaging element, and a piston. The first engaging element is configured to be moved according to change of a position of the piston. The first engaging element and the second engaging element are coupled to each other such that torque can be transmitted from the first engaging element to the second engaging element. The control system comprises an electronic control unit. The electronic control unit is configured to learn an engagement start position, according to a rotational speed of one of the first engaging element and the second engaging element. The engagement start position is a position of the first engaging element at the time when the first engaging element and the second engaging element start contacting with each other.

2 Claims, 7 Drawing Sheets

(52) U.S. Cl.
CPC ........... *F16D 2500/1045* (2013.01); *F16D 2500/10412* (2013.01); *F16D 2500/3026* (2013.01); *F16D 2500/3067* (2013.01); *F16D 2500/30415* (2013.01); *F16D 2500/30426* (2013.01); *F16D 2500/3166* (2013.01); *F16D 2500/5012* (2013.01); *F16D 2500/50239* (2013.01); *F16D 2500/50245* (2013.01); *F16D 2500/50251* (2013.01); *F16D 2500/7041* (2013.01); *F16D 2500/70605* (2013.01)

(58) Field of Classification Search
USPC .................................. 476/175, 180, 181
See application file for complete search history.

(56) References Cited

U.S. PATENT DOCUMENTS

| | | | |
|---|---|---|---|
| 5,678,674 A | 10/1997 | Nehse | |
| 7,340,336 B2* | 3/2008 | Yasui | F16D 48/06 |
| | | | 60/284 |
| 9,790,871 B2* | 10/2017 | Iizuka | F16H 61/02 |
| 2015/0127242 A1* | 5/2015 | Iizuka | F16H 61/02 |
| | | | 701/110 |
| 2016/0076606 A1 | 3/2016 | Oshiumi | |
| 2017/0089412 A1* | 3/2017 | Oshiumi | F16D 48/06 |

FOREIGN PATENT DOCUMENTS

| | | |
|---|---|---|
| JP | 2010-143365 A | 7/2010 |
| WO | 2014/178118 A1 | 11/2014 |

\* cited by examiner

| RANGE | FIRST RANGE | SECOND RANGE | THIRD RANGE |
|---|---|---|---|
| ROTATIONAL SPEED OF INPUT SHAFT | 0 -1000rpm | 1000 - 1500rpm | 1500 - 2000rpm |
| LEARNED VALUE (ENGAGEMENT START POSITION) | 16.80mm | 16.50mm | 16.00mm |

CONTROL SYSTEM FOR CLUTCH

CROSS-REFERENCE TO RELATED APPLICATIONS

This is a national phase application based on the PCT International Patent Application No. PCT/IB2015/000676 filed May 12, 2015, claiming priority to Japanese Patent Application No. 2014-100094 filed May 14, 2014, the entire contents of both of which are incorporated herein by reference.

BACKGROUND OF THE INVENTION

1. Field of the Invention

The invention relates to a control system for a clutch, which is configured to bring mutually opposed engaging elements into contact with each other, so as to couple the engaging elements with each other such that torque can be transmitted therebetween.

2. Description of Related Art

A hybrid vehicle having an engine and a motor as driving power sources is described in Japanese Patent Application Publication No. 2010-143365 (JP 2010-143365 A). When the hybrid vehicle runs in an EV running mode, using only power of the motor as driving force, the engine is cut off from a power transmission system. More specifically, the engine and the motor are connected to each other via a clutch. The clutch is a known dry-type single-disc clutch, and includes a clutch disc that is disposed between a pressure plate and a flywheel such that it is movable in the axial direction. The clutch is also provided with a diaphragm spring that applies spring force to the pressure plate. Further, a hydraulic actuator is provided for pressing a radially inner portion of the diaphragm spring, so as to reduce a load with which the diaphragm spring presses the pressure plate. Accordingly, when the load with which the diaphragm spring is pressed by means of the hydraulic actuator is small, the clutch disc is sandwiched between the pressure plate and the flywheel so as to transmit torque therebetween. When the load with which the diaphragm spring is pressed by means of the hydraulic actuator is large, the pressure plate moves away from the clutch disc, so that torque is inhibited from being transmitted via the clutch.

The clutch constructed as described above is operable in a fully engaged state in which torque is completely transmitted between the engine and the motor, a fully released state in which torque is inhibited from being transmitted, and a slipping state in which torque is transmitted while the clutch disc is slipping. Accordingly, friction surfaces of the clutch disc and the pressure plate or the flywheel become inevitably worn. If the friction surfaces are worn, the position of the pressure plate when it starts being engaged with the clutch disc changes, or the position of the pressure plate in the fully engaged state changes, which may result in reduction of the clutch controllability. Therefore, a controller described in JP 2010-143365 A sets the amount of movement of the hydraulic actuator measured when the pressure plate is completely engaged with the clutch disc, as a reference point for use in control of engagement or release of the clutch, and corrects the reference point when the amount of movement changes, by an amount corresponding to the change.

In a clutch constructed like the clutch as described in JP 2010-143365 A, if a clearance between the pressure plate and the clutch disc in the fully released state is large, it may take a long time from the time when the pressure plate starts being moved, to the time when the pressure plate contacts with the clutch disc, and the control response may be reduced accordingly. On the other hand, the balance of the mass of the clutch disc is not uniform in the circumferential direction, or the radial direction, or the axial direction, and, as a result, the clutch disc may undergo plane deflection while it is rotating. Therefore, if the clearance between the pressure plate and the clutch disc in the fully released state is reduced so as to curb reduction of the control response as described above, unintended transmission of torque may take place, due to plane deflection of the clutch disc.

SUMMARY OF THE INVENTION

The invention provides a control system for a clutch, which can curb reduction of the control response, and can also curb unintended transmission of torque via engaging elements.

A control system related to the present invention is for a clutch mechanism. he The clutch mechanism includes a first engaging element, a second engaging element, and a piston. The first engaging element is configured to be moved in an axial direction by a hydraulic pressure developed according to change of a position of the piston. The second engaging element is opposed to the first engaging element in the axial direction and rotatable relative to the first engaging element. The first engaging element and the second engaging element are coupled to each other such that torque can be transmitted from the first engaging element to the second engaging element by contacting the first engaging element with the second engaging element. The control system comprises an electronic control unit. The electronic control unit is configured to learn an engagement start position, according to a rotational speed of one of the first engaging element and the second engaging element. The engagement start position is a position of the first engaging element at a time when the first engaging element and the second engaging element start contacting with each other.

According to the invention, the clutch is configured to transmit torque when the first engagement element moves in the axial direction until it contacts with the second engaging element. The first engaging element or the second engaging element inevitably undergoes plane deflection depending on the rotational speed. Therefore, the control system is configured to learn the engagement start position of the first engaging element, according to the rotational speed of one of the engaging elements, so as to curb unintended contact between the first engaging element and the second engaging element even when the first engaging element or the second engaging element undergoes plane deflection. Accordingly, the position of the first engaging element at the time when the first engaging element and the second engaging element start contacting with each other can be learned in view of the amount of plane deflection of the first engaging element or the second engaging element. As a result, while the first engaging element and the second engaging element are spaced apart from each other, the first engaging element and the second engaging element can be moved to be close to each other, within the range in which the first engaging element and the second engaging element do not unintendedly contact with each other. Therefore, the control response at the time when the first engaging element is brought into contact with the second engaging element can be improved, and unintended transmission of torque can be curbed or prevented.

The electronic control unit may be configured to learn the engagement start position again, after a predetermined period elapses since the engagement start position is learned.

The control system leans the engagement start position again, after a lapse of the predetermined period from the time when the engagement start position was learned. In this manner, when the amount of plan deflection of the first engaging element or the second engaging element varies due to chronological changes thereof, or when contact surfaces of the engaging elements are worn, for example, otherwise possible reduction of the control response due to the chronological changes and unintended transmission of torque can be curbed or prevented.

The electronic control unit may be configured to divide the rotational speed of one of the first engaging element and the second engaging element into a plurality of ranges delimited by predetermined rotational speeds, and learn the engagement start position for each of the ranges.

Further, if the rotational speed of one of the engaging elements is divided into two or more ranges delimited by predetermined rotational speeds, and the engagement start position of the first engaging element is learned for each of the ranges, the learning control is less likely or unlikely to be cumbersome and complicated, and the frequency at which the first engaging element is driven can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 5:
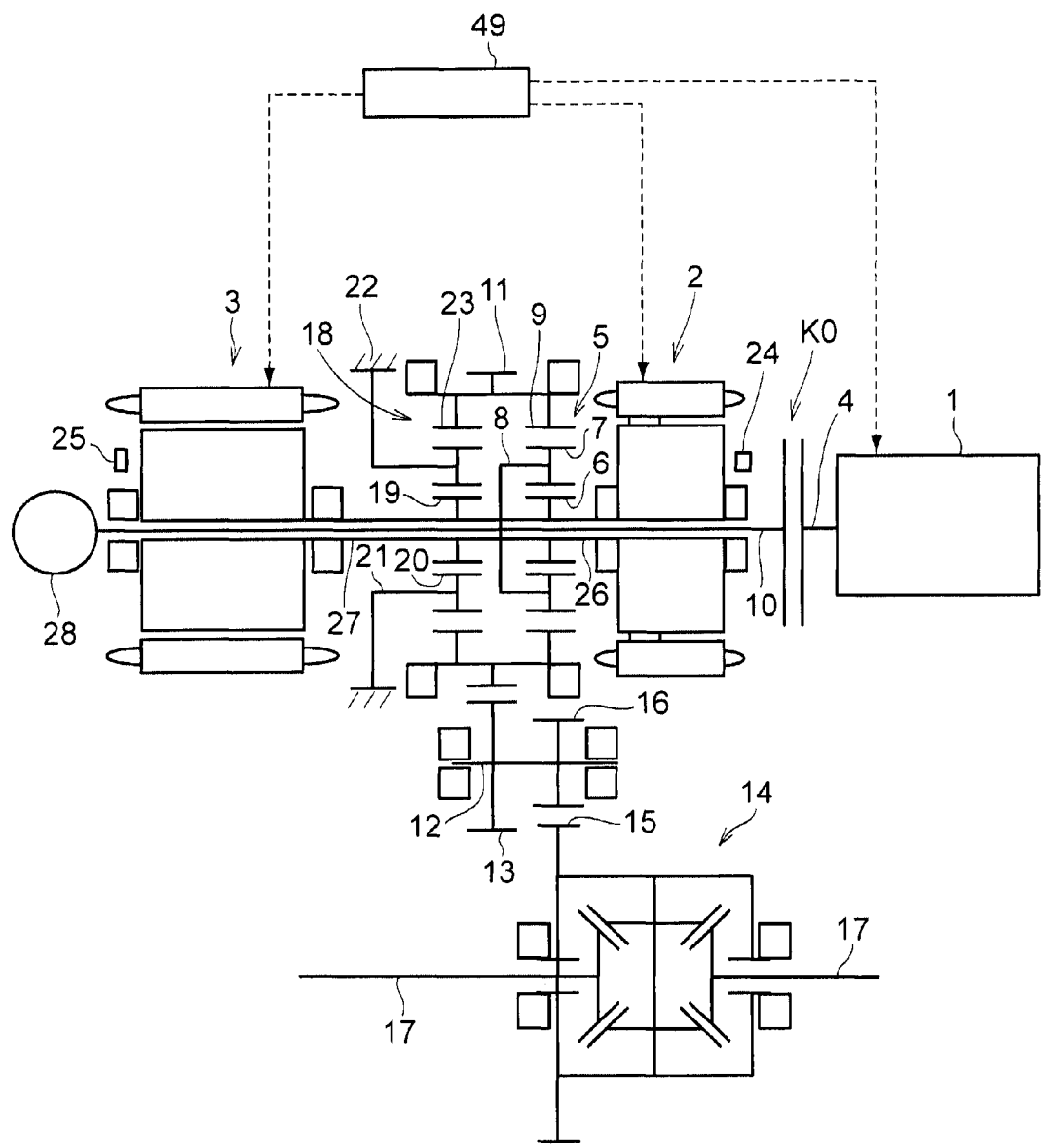
FIG. 5 is a skeleton diaphragm showing one example of vehicle including a clutch, in which the control system of the invention is used.

The clutch according to the invention includes the first engaging element that is movable in an axial direction, and a second engaging element that is opposed to the first engaging element in the axial direction and is located so as to be rotatable relative to the first engaging element. When the first engaging element is brought into contact with the second engaging element, the first and second engaging elements are coupled to each other such that torque can be transmitted between these elements. One example of vehicle including the clutch thus configured is schematically shown in FIG. 5. The vehicle shown in FIG. 5 is a hybrid vehicle including an engine 1 and two motor-generators 2, 3 as driving power sources, and a power split device 5 is coupled to an output shaft 4 of the engine 1 via a clutch K0. The power split device 5 is configured similarly to a known power split device used in a two-motor-type hybrid vehicle, and is formed by a single-pinion-type planetary gear train. More specifically, the planetary gear train consists of a sun gear 6, a carrier 8 that holds two or more pinion gears 7 that mesh with the sun gear 6 such that the pinion gears 7 can rotate about themselves and about the axis of the gear train, and a ring gear 9 that is disposed concentrically with the sun gear 6 and meshes with the pinion gears 7. A first motor-generator (MG1) 2 is coupled to the sun gear 6, and an input shaft 10 having one end portion coupled to the clutch K0 is coupled to the carrier 8. The ring gear 9 is coupled to an output gear 11 as an externally toothed gear. Also, a counter shaft 12 is disposed in parallel with the input shaft 10, and a counter driven gear 13 that meshes with the output gear 11 is coupled to one end portion of the counter shaft 12, while a counter drive gear 16 that meshes with a ring gear 15 of a differential gear 14 is coupled to the other end portion of the counter shaft 12. A drive shaft 17 that extends in the vehicle width direction is coupled to the differential gear 14.

When the power split device 5 as described above transmits output torque of the engine 1 to the drive shaft 17, the carrier 8 functions as an input element, and the sun gear 6 functions as a reaction force element, while the ring gear 9 functions as an output element. Accordingly, when torque is transmitted from the engine 1 to the power split device 5, torque is generated from the first motor-generator 2, against torque acting on the sun gear 6. Therefore, if torque is generated from the first motor-generator 2 so as to increase the rotational speed of the first motor-generator 2, power generated from the engine 1 is increased by an amount corresponding to the power generated from the first motor-generator 2. To the contrary, if torque is generated from the first motor-generator 2 so as to reduce the rotational speed of the first motor-generator 2, a part of the power generated from the engine 1 is converted by the first motor-generator 2 into electric energy; therefore, the power generated from the engine 1 is reduced by the amount corresponding to the electric energy, and transmitted to the ring gear 9. The first motor-generator 2 is a known three-phase-type synchronous electric motor to which electric power is supplied from a battery (not shown). When the first motor-generator 2 converts the power of the engine 1 into electric energy, the battery is adapted to be charged with electric power corresponding to the energy thus regenerated.

Since the operating point of the engine 1 can be continuously changed by controlling the first motor-generator 2 as described above, the rotational speed of the first motor-generator 2 is controlled so as to achieve high fuel efficiency of the engine 1. When the first motor-generator 2 is controlled to generate power for running the vehicle, the power generated from the engine 1 is increased and transmitted to the ring gear 9. When the first motor-generator 2 is controlled to convert the power of the engine 1 into electric energy, the power generated from the engine 1 is reduced and transmitted to the ring gear 9.

Thus, the vehicle shown in FIG. 5 is configured to generate power into which the power of the engine 1 has been changed by the first motor-generator 2 as described above, from the second motor-generator (MG2) 3. More specifically, the second motor-generator 3 is disposed coaxially with the input shaft 10, and power generated from the second motor-generator 3 is transmitted to an output gear 11 via a speed reducing mechanism 18 coupled to the second motor-generator 3. The speed reducing mechanism 18 is formed by a single-pinion-type planetary gear train having a sun gear 19, a carrier 21 that holds two or more pinion gears 20 meshing with the sun gear 19 such that the pinion gears 20 can rotate about themselves, and a ring gear 23. The second motor-generator 3 is coupled to the sun gear 19, and the carrier 21 is coupled to a stationary part 22, such as a housing, while the ring gear 23 is coupled to the output gear 11. Accordingly, torque generated from the second motor-generator 3 is reversed and transmitted to the output gear 11. Each of the first motor-generator 2 and the second motor-generator 3 is equipped with a resolver 24, 25 for detecting the phase of a rotor of the corresponding motor-generator). Also, an output shaft 26, 27 of each of the motor-generators 2, 3 is formed in a hollow shape, and is fitted on the input shaft 10. A mechanical oil pump 28 is coupled to an end portion of the input shaft 10.

Like the first motor-generator 2, the second motor-generator 3 as described above is formed by a three-phase-type synchronous electric motor. When the first motor-generator 2 is controlled to generate power for running the vehicle, the second motor-generator 3 is controlled so as to convert the power generated from the first motor-generator 2 into electric energy. To the contrary, when the first motor-generator 2 is controlled to convert the power of the engine 1 into electric energy, the second motor-generator 3 is controlled so as to deliver power corresponding to the amount of electric energy recovered by the first motor-generator 2.

As described above, when the power generated from the engine 1 is transmitted to the drive shaft 17, either one of the first and second motor-generators 2, 3 is controlled to generate power for running the vehicle so that the power thus generated is added to the power of the engine 1. Thus, in the following description, the running mode in which the vehicle runs with power generated from the engine 1 and transmitted to the drive shaft 17 will be denoted as "HV running mode".

The vehicle as shown in FIG. 5 is also able to run in an EV running mode, in addition to the above-described HV running mode. In the EV running mode, the vehicle runs only with the power generated from the second motor-generator 3 and transmitted to the drive shaft 17. When the vehicle runs in the EV running mode, the engine 1 can be stopped; therefore, the fuel economy is improved.

During running in the EV running mode, output torque of the second motor-generator 3 is transmitted to the power split device 5. If the clutch K0 is engaged when torque is transmitted to the power split device 5, the first motor-generator 2 is rotated while the engine 1 is kept stopped, since the inertia torque of the engine 1 is larger than the inertia torque of the first motor-generator 2. Accordingly, there arises a power loss corresponding to the amount of power for rotating the first motor-generator 2; therefore, the vehicle shown in FIG. 5 is arranged to be able to release the clutch K0 when it runs in the EV running mode. With the clutch K0 thus released, the first motor-generator 2 is kept stopped due to cogging torque determined by the structure of the first motor-generator 2, etc., and the input shaft 10 is rotated, so that the power loss can be reduced. In the following description, the mode in which the clutch K0 is released, and the vehicle runs only with the power generated from the second motor-generator 3 will be denoted as "cut-off EV running mode", and the mode in which the clutch K0 is engaged, and the vehicle runs only with the power generated from the second motor-generator 3 will be denoted as "normal EV running mode".

Since the vehicle runs only with the power of the second motor-generator 3 in the EV running mode as described above, the driving force that can be produced in this mode is smaller than that produced in the HV running mode. Also, the vehicle speed at which the vehicle can run in the EV running mode is lower than that of the HV running mode, due to restrictions imposed by characteristics, durability, etc. of the second motor-generator 3. Therefore, when the vehicle is highly likely to be switched to the HV running mode since the required driving force is relative large or the vehicle speed is relatively high, the normal EV running mode is set.

Figure 6:
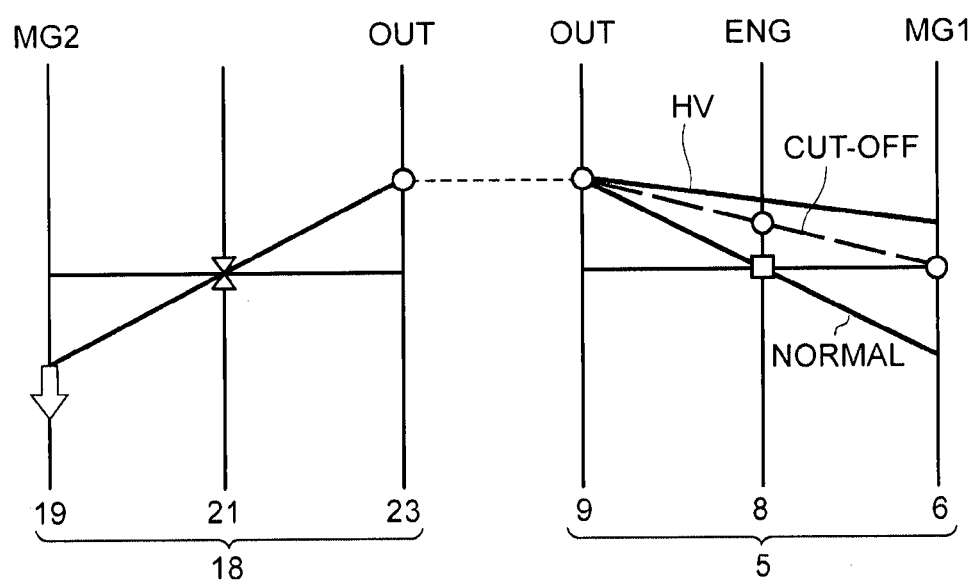
FIG. 6 is a nomographic chart useful for explaining operating states of respective rotary elements of a power split device and a speed reducing mechanism.

FIG. 6 is a nomographic chart showing operating states of respective rotary elements of the power split device 5 and the speed reducing mechanism 18 when each of the above-indicated running modes is set. In the nomographic chart of FIG. 6, vertical lines represent the sun gear 6, carrier 8 and the ring gear 9 of the power split device 5, and the sun gear 19, carrier 21 and the ring gear 23 of the speed reducing mechanism 18, respectively. In FIG. 6, the intervals between the vertical lines correspond to the gear ratios of the planetary gear trains that constitute the power split device 5 and the speed reducing mechanism 18, and the vertical direction of each of the vertical lines indicates the rotational direction, while the position as viewed in the vertical direction indicates the rotational speed. In FIG. 6, a line denoted as "CUT-OFF" indicates operating states of the respective rotary elements of the power split device 5 when the vehicle runs in the cut-off EV running mode. In this running mode, the second motor-generator 3 functions as a motor to generate power with which the vehicle runs, and the clutch K0 is released so that the engine 1 is cut off from a power transmission system and stopped, while the first motor-generator 2 is also stopped. Accordingly, rotation of the sun gear 6 is stopped, whereas the ring gear 9 rotates in the positive direction along with the output gear 11, while the carrier 8 rotates in the positive direction at a rotational speed that is reduced according to the gear ratio of the planetary gear train, relative to the rotational speed of the ring gear 9.

Also, a line denoted as "NORMAL" in FIG. 6 indicates the operating states of the respective rotary elements of the power split device 5 when the vehicle runs in the normal EV running mode. In this running mode, the vehicle runs with power of the second motor-generator 3, and the engine 1 is stopped; therefore, the ring gear 9 rotates in the positive direction, and the sun gear 6 rotates in the reverse direction, while the carrier 8 is fixed. In this case, the first motor-generator 2 may function as a generator.

Further, a line denoted as "HV" in FIG. 6 indicates the operating states of the respective rotary elements of the power split device 5 when the vehicle runs in the HV running mode. In this running mode, the engine 1 delivers driving force in a condition where the clutch K0 is engaged, so that torque is applied to the carrier 8 so as to rotate the carrier 8 in the positive direction. In this condition, the first motor-generator 2 is operated as a generator, so that torque is applied to the sun gear 6 so as to rotate the sun gear 6 in the reverse direction. As a result, torque is applied to the ring gear 9 so as to rotate the ring gear 9 in the positive direction. Also, in this case, electric power generated by the first motor-generator 2 is supplied to the second motor-generator 3, so that the second motor-generator 3 functions as a motor, and driving force produced by the second motor-generator 3 is transmitted to the output gear 11. Accordingly, in the HV running mode, a part of the power generated by the engine 1 is transmitted to the output gear 11 via the power split device 5, and the remaining part of the power is converted by the first motor-generator 2 into electric power, which is transmitted to the second motor-generator 3. Then, the electric power is re-converted by the second motor-generator 3 into mechanical power, which is then transmitted to the output gear 11.

In any of the above-indicated running modes, when the vehicle need not positively generate driving force, such as when the vehicle is decelerated, either one of the first and second motor-generators 2, 3 is operated as a generator, so as to convert kinetic energy into electric energy. In the HV running mode, in addition to the regenerative operation of the motor-generator 2, 3, engine brake force arising from a pumping loss, or the like, of the engine 1 may be applied. Further, when the vehicle runs with driving force generated in the HV running mode, electric power may be supplied from a power storage device to the second motor-generator 3, in addition to electric power generated by the first motor-generator 2 and supplied to the second motor-generator 3.

Next, one example of the clutch K0 that is released when the vehicle switches from the HV running mode or the normal EV running mode to the cut-off EV running mode will be described with reference to the cross-sectional view shown in FIG. 7. The clutch K0 shown in FIG. 7 principally consists of a flywheel 30, an annular pressure plate 31, and a clutch disc 33 adapted to be sandwiched between the flywheel 30 and the pressure plate 31. The flywheel 30 is integrally mounted on the output shaft 4 of the engine 1 with a bolt 29. The pressure plate 31 is located so as to be opposed to the flywheel 30. The clutch disc 33 is coupled to the input shaft 10 via a torsional damper 32. When the clutch disc 33 is sandwiched between the pressure plate 31 and the flywheel 30, torque is transmitted via the clutch K0. Namely, the amount of torque transmitted via the clutch K0 corresponds to the force with which the clutch disc 33 is sandwiched or pressed by and between the pressure plate 31 and the flywheel 30. The pressure plate 31 is covered with a clutch cover 34 that is integrated with the flywheel 30 by means of a rivet (not shown), and is coupled to the clutch cover 34 via a strap plate 35, such that the pressure plate 31 can rotate as a unit with the clutch cover 34 and can also move in the axial direction. Also, friction materials 36, 37 are attached to the opposite surfaces of the clutch disc 33. The pressure plate 31 is one example of the first engaging element of the invention, and the clutch disc 33 and the friction materials 36, 37 are one example of the second engaging element of the invention.

Figure 7:
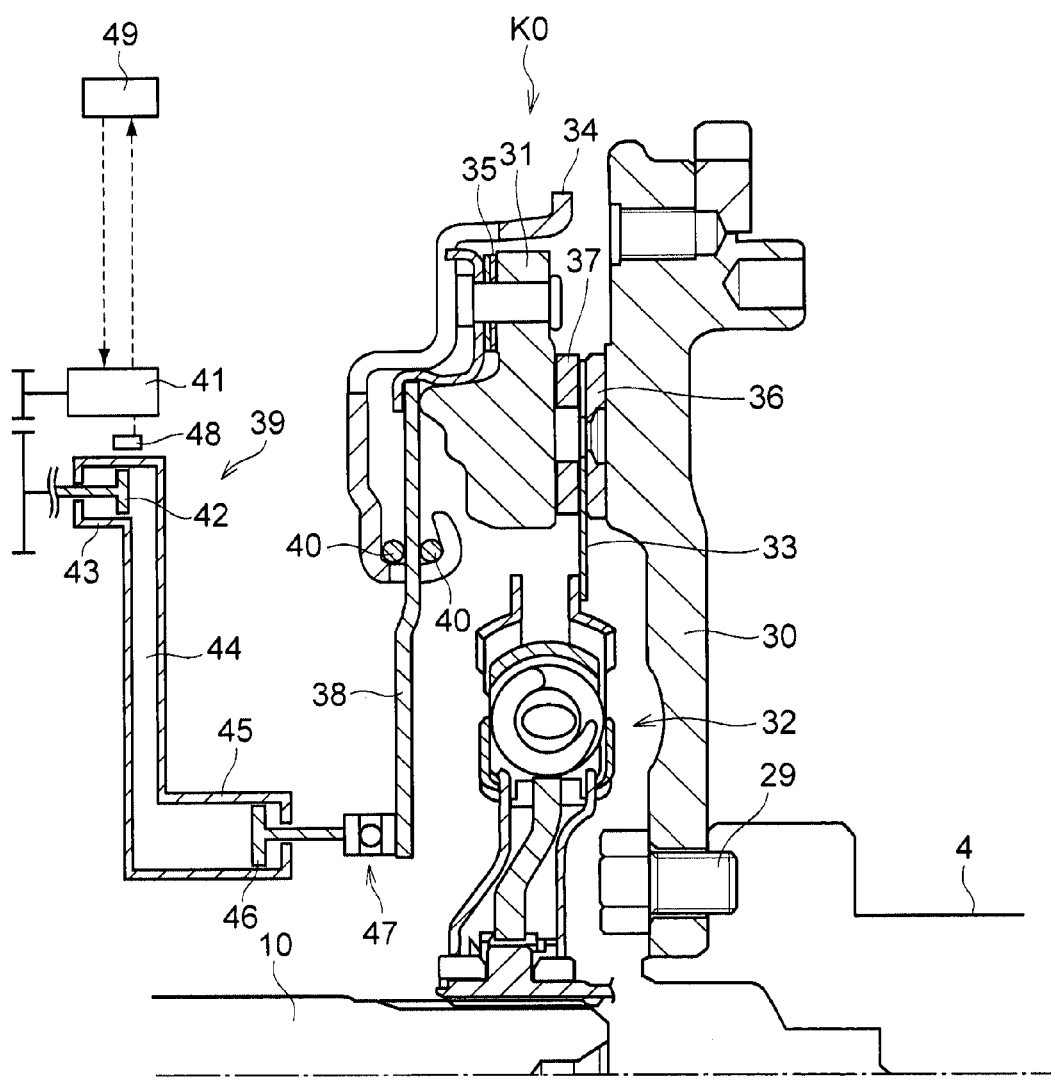
FIG. 7 is a cross-sectional view illustrating one example of clutch.

The clutch K0 shown in FIG. 7 is constructed such that the pressure plate 31 is pressed against the clutch disc 33 under the elastic force of a diaphragm spring 38. More specifically, a radially outer portion of the diaphragm spring 38 is joined to the pressure plate 31 such that the diaphragm spring 38 moves in the axial direction integrally with the pressure plate 31, and its radially inner portion is joined to a release mechanism 39 that receives reaction force of the diaphragm spring 38 and is operable to reduce the elastic force of the spring 38. A radially middle portion of the diaphragm spring 38 is sandwiched between and held by two pivot rings 40 provided on the clutch cover 34. Namely, in the diaphragm spring 38 shown in FIG. 7, the radially outer portion serves as a point of application or action, and the radially middle portion serves as a point of support, while the radially inner portion serves as a point of effort. The diaphragm spring 38 shown in FIG. 7 normally applies a load to the pressure plate 31 so as to make the pressure plate 31 close to the flywheel 30. When the release mechanism 39 is operated to press the radially inner portion of the diaphragm spring 38, the load applied to the pressure plate 31 is reduced.

The configuration of the release mechanism 39 shown in FIG. 7 will be described. In the example shown in FIG. 7, the release mechanism 39 includes a first piston 42, a first cylinder 43, an oil passage 44, a second cylinder 45, and a second piston 46. In operation, power is transmitted from a motor 41 to the first piston 42 so that the first piston 42 can move back and forward. The first cylinder 43 is open at one end portion, and the first piston 42 is inserted in the first cylinder 43. When the first piston 42 moves toward the opening of the first cylinder 43, the oil contained in the first cylinder 43 is pushed and delivered from the first cylinder 43. One end portion of the oil passage 44 is connected to the opening of the first cylinder 43, and the other end portion of the oil passage 44 is connected to the second cylinder 45. Accordingly, the oil delivered from the first cylinder 43 is supplied to the second cylinder 45. The second piston 46 is inserted in the second cylinder 45 such that the second piston 46 is movable in the axial direction. When the oil delivered from the first cylinder 43 is supplied to the second cylinder 45, the second piston 46 is moved. Also, the diaphragm spring 38 is connected to an end portion of the second piston 46 via a bearing 47. With this arrangement, when the second piston 46 is moved in the axial direction, the radially inner portion of the diaphragm spring 38 is pressed, so that the load applied to the pressure plate 31 so as to press the clutch disc 33 against the flywheel 30 is reduced. Namely, the amount of torque transmitted via the clutch K0 is reduced. When the motor 41 is driven so that the first piston 42 moves away from the opening of the first cylinder 43, the internal pressure of the first cylinder 43 is reduced, so that the oil flows from the second cylinder 45 toward the first cylinder 43. As a result, the second piston 46 moves away from the diaphragm spring 38.

In the release mechanism 39 as described above, the position of the first piston 42 is determined according to the phase of the motor 41. Accordingly, it is possible to control the position of the radially outer portion of the diaphragm spring 38, namely, control the position of the pressure plate 31, by controlling the position of the first piston 42. With the position of the pressure plate 31 thus controlled, the amount of torque transmitted via the clutch K0 can be controlled. Therefore, in the example shown in FIG. 7, a sensor 48 is provided for detecting the position of the first piston 42, and the motor 41 is controlled based on a signal detected by the sensor 48, so as to control the amount of torque transmitted via the clutch K0.

The clutch of the invention is not limited to the clutch K0 as shown in FIG. 7, but may be a known dry-type or wet-type clutch, and may be a single-disc or multiple-disc clutch. Further, the clutch of the invention is only required to be able to control the amount of torque transmitted therethrough, and the arrangement for switching the clutch between an engaged state and a released state is not limited to an arrangement like the release mechanism 39 shown in FIG. 7, but may be a hydraulic actuator or an electromagnetic actuator.

The vehicle shown in FIG. 5 includes an electronic control unit 49 that controls the engine 1, first and second motor-generators 2, 3, and the motor 41. The electronic control unit 49 has a microcomputer as a main component, and receives signals from the above-indicated sensor 48, resolvers 24, 25 and so forth. The electronic control unit 49 is configured to output signals to the engine 1, first and second motor-generators 2, 3, and the motor 41, based on the signals thus received and data stored in advance.

As described above, while the vehicle is running in the cut-off EV running mode, the release mechanism 39 presses the diaphragm spring 38 in the clutch K0 as shown in FIG. 7, so that the pressure plate 31 moves away from the clutch disc 33. If the accelerator pedal (not shown) is depressed, for example, in a condition where the pressure plate 31 is spaced apart from the clutch disc 33, the running mode is switched to the HV running mode, which is established by engaging the pressure plate 31 with the clutch disc 33. Accordingly, when the vehicle runs in the cut-off EV running mode, it is preferable to provide a relatively small clearance between the pressure plate 31 and the clutch disc 33, so as to improve the control response to switching of the running mode.

As described above, the clutch disc 33 is connected to the input shaft 10. Also, during running in the cut-off EV running mode, the carrier 8 coupled to the input shaft 10 is rotated, as shown in FIG. 6. Accordingly, the clutch disc 33 rotates in the cut-off EV running mode. The clutch disc 33 is connected to the input shaft 10 via the torsional damper 32, and the distribution of the masses of members that constitute the clutch disc 33 and the torsional damper 32 is not uniform in the axial direction, or circumferential direction, or radial directions. Further, these members differ in the stiffness. Therefore, if the input shaft 10 rotates, in a condition where the pressure plate 31 is spaced apart from the clutch disc 33, the clutch disc 33 may undergo plane deflection. In particular, when the vehicle runs at a low speed in the EV running mode, the amount of plane deflection (which will be denoted as "plane deflection amount") of the clutch disc 33 increases as the rotational speed of the input shaft 10 increases.

The position of the first piston 42 of the release mechanism 39 obtained when the pressure plate 31 starts contacting with the clutch disc 33 in the clutch K0 varies depending on individual differences, or the like. Further, as described above, the amount of torque transmitted via the clutch K0 can be changed by changing the force with which the clutch disc 33 is sandwiched between the pressure plate 31 and the flywheel 20; therefore, the clutch K0 may transmit torque while slipping. Consequently, the clutch disc 33, more specifically, the friction materials 36, 37 may be worn, and the position of the first piston 42 obtained when the pressure plate 31 starts contacting with the clutch disc 33 may be changed.

Therefore, the electronic control unit 49 is configured to learn the position of the pressure plate 31 when it starts being engaged with the clutch disc 33, according to the rotational speed of the input shaft 10, so as to determine the position of the pressure plate 31 while the vehicle is running in the cut-off EV running mode. In the following description, the position of the pressure plate 31 in the cut-off EV running mode will be called "standby position". Also, the position of the pressure plate 31 at the time when the pressure plate 31 starts being engaged with the clutch disc 33 will be called "engagement start position". The position of the pressure plate 31 is controlled by controlling the first piston 42 of the release mechanism 39. Therefore, the engagement start position is learned based on the position of the first piston 42. In the example as will be described below, the rotational speed of the input shaft 10 is divided into given ranges delimited by predetermined rotational speeds, and the position of the first piston 42 when the pressure plate 31 starts being engaged with the clutch disc 33 is learned for each of the thus delimited ranges of the rotational speed.

Figures 1, 2:
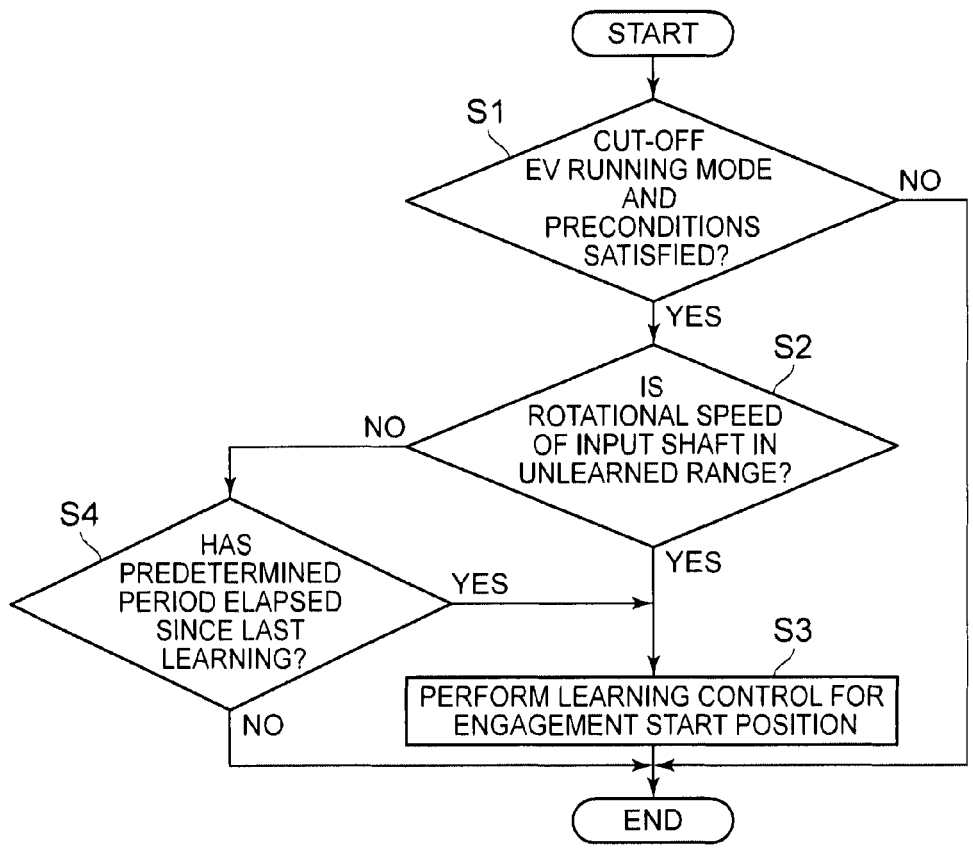
FIG. 1 is a flowchart useful for explaining one example of control executed by a control system for a clutch according to the invention.
FIG. 2 is a table showing ranges into which the rotational speed of an input shaft is divided for execution of learning control.

FIG. 1 is a flowchart useful for explaining one example of the control as described above. A control routine illustrated in the flowchart of FIG. 1 is repeatedly executed at predetermined time intervals. In the control routine shown in FIG. 1, it is initially determined whether the vehicle is running in the cut-off EV running mode, and preconditions under which the engagement start position is learned are satisfied (step S1). More specifically, the electronic control unit 49 determines whether a signal for driving the first motor-generator 2 is not output from the electronic control unit 49, and a signal for releasing the clutch K0 is output, so as to determine whether the vehicle is running in the cut-off EV running mode. Also, the electronic control unit 49 determines whether the rotational speed of the first motor-generator 2 is equal to "0", and a signal detected by the sensor 48 indicates that the clutch K0 is released, so as to determine whether the preconditions under which the engagement start position is learned are satisfied. Thus, the condition that the rotational speed of the first motor-generator 2 is equal to "0", and the condition that the signal detected by the sensor 48 indicates that the clutch K0 is released are set as the preconditions under which the engagement start position is learned, so that the engagement start position is learned under a condition that the phase of the first motor-generator 2 is shifted while the position of the first piston 42 is gradually changed as will be described later.

If the vehicle is running in the HV running mode or the normal EV running mode, or the preconditions under which the learning control for the engagement start position is performed are not satisfied, a negative decision (NO) is obtained in step S1, and the current cycle of this control routine ends. To the contrary, if the vehicle is running in the cut-off EV running mode, and the preconditions under which the engagement start position is learned are satisfied, an affirmative decision (YES) is obtained in step S1, and it is then determined whether the rotational speed of the input shaft 10 falls within a range of rotational speed for which the engagement start position has not been learned (step S2). FIG. 2 is a table in which the rotational speed of the input shaft 10 is divided into three ranges. In the example shown in FIG. 2, the rotational speed of the input shaft 10 is divided into a first range of 0 to 1000 rpm, a second range of 1000 to 1500 rpm, and a third range of 1500 to 2000 rpm, but the intervals between the boundaries of these ranges may be changed according to individual differences and specifications. If only the engagement start position for the third range, for example, among the ranges shown in FIG. 2, is not learned, and the current rotational speed of the input shaft 10 is between 1500 rpm and 2000 rpm, an affirmative decision (YES) is obtained in step S2. If an affirmative decision (YES) is obtained in step S2, learning control for the engagement start position in this range is carried out (step S3), and the current cycle of this control routine ends.

To the contrary, if the rotational speed of the input shaft 10 is equal to or lower than 1500 rpm, and a negative decision (NO) is obtained in step S2, it is determined whether a predetermined period has elapsed since learning control for the engagement start position in the first or second region including the current rotational speed of the input shaft 10 was performed last time (step S4). In this connection, the clutch disc 33 is coupled to the input shaft 10 via the torsional damper 32. Therefore, if characteristics and sliding resistance of the torsional damper 32 change due to chronological or time degradation thereof, the amount of plane deflection of the clutch disc 33 relative to the rotational speed of the input shaft 10 may change. Also, if any of the clutch disc 33, pressure plate 31 and the flywheel 30 becomes worn due to friction between the clutch disc 33 and the pressure plate 31 or the flywheel 30, the amount of plane deflection of the clutch disc 33 relative to the rotational speed of the input shaft 10 may change. Therefore, step S4 is provided for causing the electronic control unit 49 to learn the engagement start position again, in the case where there is a possibility that the engagement start position is changed due to chronological changes, or the like. The predetermined period used in step S4 is determined in advance by calculation or simulation, based on the time that has elapsed since the learning control for the engagement start position was performed last time, travelling distance, the frequency of engagement and release of the clutch K0, and so forth.

If the predetermined period has not elapsed since the learning control for the engagement start position was performed last time, and a negative decision (NO) is obtained in step S4, the current cycle of this control routine ends. To the contrary, if the predetermined period has elapsed since the learning control for the engagement start position was performed last time, and an affirmative decision (YES) is obtained in step S4, learning control for the engagement start position is performed again (step S3), and the current cycle of this control routine ends.

Figure 3:
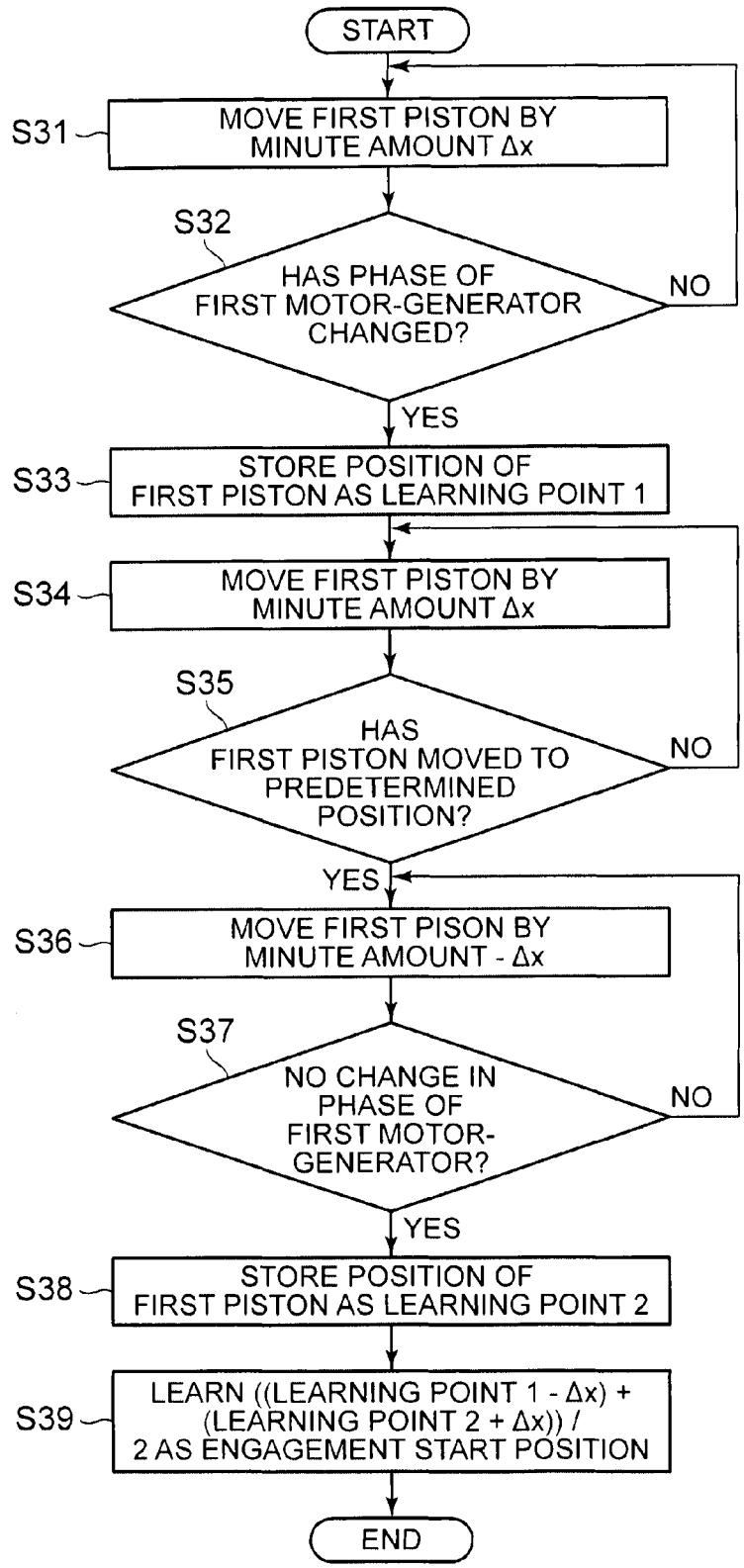
FIG. 3 is a flowchart useful for explaining one example of control for learning an engagement start position of a clutch.

One example of the learning control for the engagement start position will be described. FIG. 3 is a flowchart useful for explaining one example of the learning control. In the learning control shown in FIG. 3, initially, the first piston 42 is moved by an extremely small amount Δx within a range in which the motor 41 can be controlled, so that the pressure plate 31 comes closer to the clutch disc 33 (step S31). Then, the electronic control unit 49 determines whether the phase of the first motor-generator 2 has changed, so as to determine whether the pressure plate 31 has contacted with the clutch disc 33 (step S32). More specifically, it is determined whether the phase detected by the resolver 24 provided for the first motor-generator 2 has changed. This is because the first motor-generator 2 is stopped when the vehicle is running in the cut-off EV running mode; therefore, if the clutch K0 starts transmitting torque, the torque is applied so as to rotate the first motor-generator 2 with the sun gear 6 functioning as reaction force, and the phase of the rotor of the first motor-generator 2 changes. The sun gear 6 functions as reaction force, because the inertia torque of the engine 1 is larger than the inertia torque of the first motor-generator 2, as in the normal EV running mode. At a point in time at which the pressure plate 31 starts contacting with the clutch disc 33, torque that is smaller than the maximum value of cogging torque is transmitted to the first motor-generator 2, since the amount of torque transmitted via the clutch K0 is small. Accordingly, only the phase of the rotor of the first motor-generator 2 is shifted, but the first motor-generator 2 does not rotate.

If the phase detected by the resolver 24 is not changed, and a negative decision (NO) is obtained in step S32, the pressure plate 31 has not contacted with the clutch disc 33. Therefore, the control returns to step S31, in which the first piston 42 is moved by the minute amount Δx again. If the pressure plate 31 and the clutch disc 33 start contacting with each other while the first piston 42 is gradually moved in this manner, the phase of the rotor of the first motor-generator 2 changes, and an affirmative decision (YES) is obtained in step S32. If an affirmative decision (YES) is obtained in step S32, the position of the first piston 42 is temporarily stored as "learning point 1" in the electronic control unit 49 (step S33).

After execution of step S33, the first piston 42 is further moved by the minute amount Δx so as to press the pressure plate 31 against the clutch disc 33 (step S34), and it is determined whether the first piston 42 has moved to a predetermined position (step S35). The predetermined position used in step S35 is a position that is determined within a range in which torque smaller than the maximum value of cogging torque of the first motor-generator 2 is transmitted to the first motor-generator 2, and also a position that is determined in advance so that the pressure plate 31 and the clutch disc 33 contact with each other even if the clutch disc 33 or the pressure plate 31, or the like, is worn.

If the first piston 42 has not moved to the predetermined position, and a negative decision (NO) is obtained in step S35, step S34 is repeatedly executed until the first piston 42 reaches the predetermined position. To the contrary, if the first piston 42 has moved to the predetermined position, and an affirmative decision (YES) is obtained in step S35, the first piston 42 is moved by the minute amount Δx so that the pressure plate 31 moves away from the clutch disc 33 (step S36), and it is determined whether the phase detected by the resolver 24 is not changed (step S37). Contrary to the above-indicated step S32, if the pressure plate 31 moves away from the clutch disc 33, the first motor-generator 2 is stopped at a given position due to the cogging torque. Accordingly, in step S37, it is determined whether the pressure plate 31 has moved away from the clutch disc 33.

If the phase detected by the resolver 24 changes, and a negative decision (NO) is obtained in step S37, which means that the pressure plate 31 and the clutch disc 33 has been in contact with each other, step S36 is continuously executed as long as the phase detected by the resolver 24 is changing. To the contrary, if the phase detected by the resolver 24 does not change, and an affirmative decision (YES) is obtained in step S37, the position of the first piston 42 is temporarily stored as "learning point 2" in the electronic control unit 49 (step S38). Then, an average of a value obtained by subtracting the minute amount Δx by which the first piston 42 is moved, from the learning point 1 stored in step S33, and a value obtained by adding the minute amount Δx by which the first piston 42 is moved, to the learning point 2 stored in step S38, is learned as the engagement start position (step S39), and the current cycle of this control routine ends.

Figure 4:
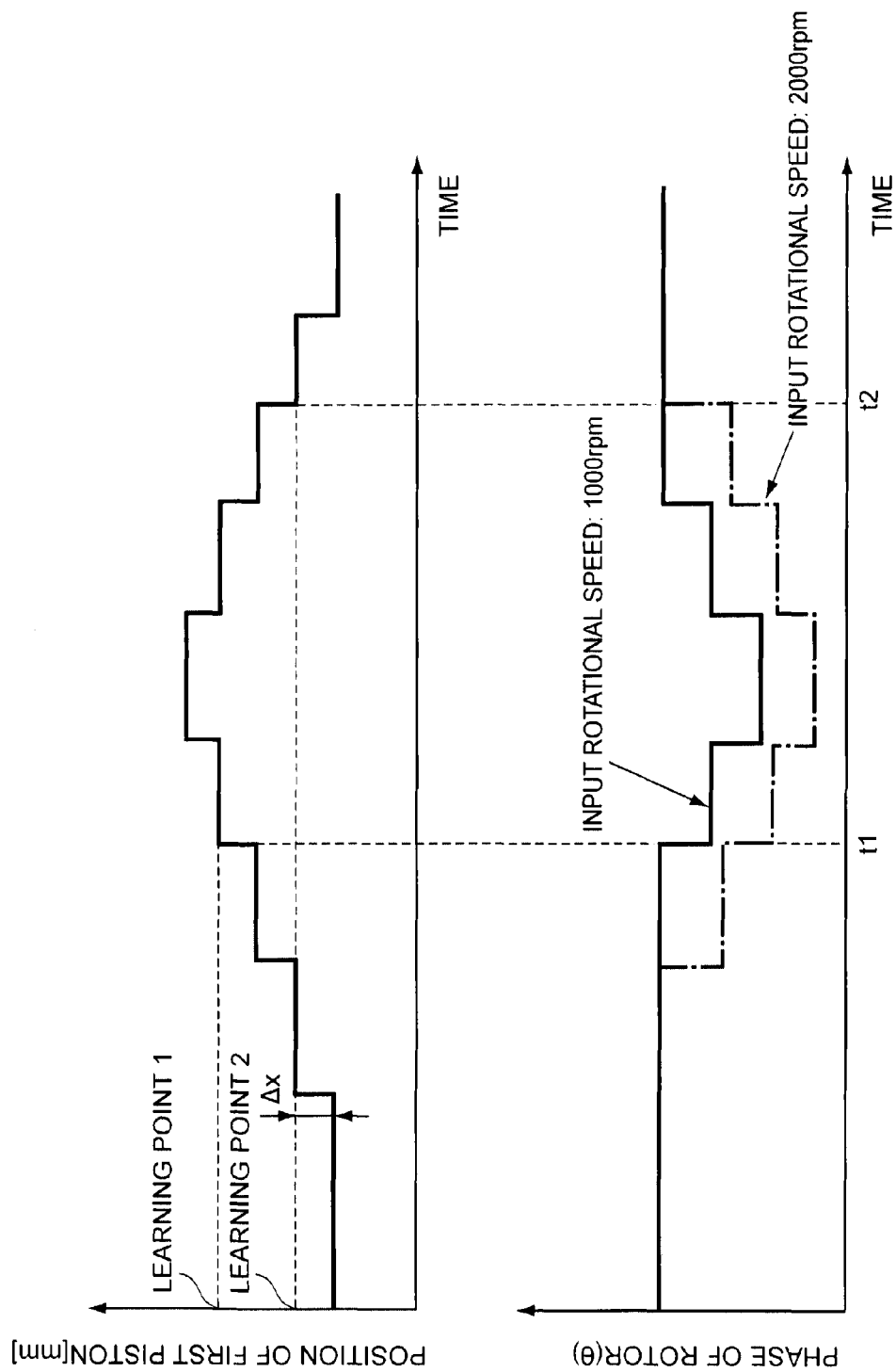
FIG. 4 is a time chart showing the amount of movement of a first piston and changes in the phase detected by a resolver when the learning control is performed.

Next, changes in the amount of movement of the first piston 42 and the phase detected by the resolver 24 when the learning control is performed will be explained with reference to the time chart shown in FIG. 4. In FIG. 4, changes in the phase detected by the resolver 24 when the rotational speed of the input shaft 10 (INPUT ROTATIONAL SPEED) is equal to 1000 rpm are indicated by a solid line, and changes in the phase detected by the resolver 24 when the rotational speed of the input shaft 10 is equal to 2000 rpm are indicated by a one-dot chain line. In the example shown in FIG. 4, the clutch K0 is initially in a released state. While the clutch K0 is released, the first piston 42 is moved by a minute amount Δx at a time, so that the pressure plate 31 and the clutch disc 33 come closer to each other. Then, if the pressure plate 31 and the clutch disc 33 contact with each other, the phase detected by the resolver 24 changes at time t1 when the rotational speed of the input shaft 10 is 1000 rpm. The position of the first piston 42 at this point in time t1 is stored as "learning point 1" in the electronic control unit 49. As the first piston 42 is further moved, torque transmitted to the first motor-generator 2 is increased. Therefore, the phase of the rotor of the first motor-generator 2 changes, and the phase detected by the resolver 24 changes. The first piston 42 is moved within the range in which the first motor-generator 2 is not rotated, namely, so that torque applied to the first motor-generator 2 is kept smaller than the cogging torque of the first motor-generator 2; therefore, the phase detected by the resolver 24 changes according to the amount of movement of the first piston 42, but the rotor of the first motor-generator 2 is stopped at a position where the torque applied to the first motor-generator 2 is balanced with the cogging torque, even if the amount of torque transmitted via the clutch K0 is increased.

After the first piston 42 is moved to the predetermined position, the pressure plate 31 is moved by a given amount at a time so that the pressure plate 31 is moved away from the clutch disc 33. If the first piston 42 is moved, and the pressure plate 31 is moved away from the clutch disc 33, the phase detected by the resolver 24 ceases to change at time t2 when the rotational speed of the input shaft 10 is 1000 rpm. The position of the first piston 42 at time t2 is stored as "learning point 2" in the electronic control unit 49. Then, the engagement start position is learned based on the positions of the first piston 42 at time t1 and time t2.

As described above, the amount of plane deflection of the clutch disc 33 changes according to the rotational speed of the input shaft 10. Accordingly, if the rotational speed of the input shaft 10 is high, a point in time at which the phase detected by the resolver 24 starts changing comes earlier than that in the case where the rotational speed of the input shaft 10 is low, and a point in time at which the phase detected by the resolver 24 ceases to change comes later than that in the case where the rotational speed of the input shaft 10 is low.

Thus, as the rotational speed of the input shaft 10 is higher, the pressure plate 31 and the clutch disc 33 start contacting with each other earlier; therefore, as shown in FIG. 2, the amount of movement of the first piston 42, which is learned as the engagement start position, is reduced from the first range toward the third range. The amount of movement of the first piston 42 in FIG. 2 is equal to "0" when the first piston 42 is located at a position closest to the opening of the first cylinder 43, namely, at a position where the pressure plate 31 is completely spaced apart from the clutch disc 33.

As described above, the position of the first piston 42 at the time when the pressure plate 31 and the clutch disc 33 start being engaged with each other is learned according to the rotational speed of the input shaft 10, so that the standby position of the pressure plate 31 can be prevented from being excessively spaced apart from the clutch disc 33 during running in the cut-off EV running mode, and the response can be improved when the clutch K0 is engaged. It is also possible to curb or prevent unintended contact between the pressure plate 31 and the clutch disc 33, and resulting transmission of torque therebetween, which would be caused by plane deflection of the clutch disc 33. Further, even if the amount of plane deflection of the clutch disc 33 varies due to wear of the pressure plate 31 or the clutch disc 33, or chronological degradation thereof, for example, the engagement start position is learned again, after a lapse of the predetermined period after the learning control is once performed, as described above, so that any change of the engagement start position due to changes in the amount of plane deflection can be learned. Consequently, otherwise possible reduction of the response when the clutch K0 is engaged, and unintended transmission of torque, can be curbed or prevented. Also, the rotational speed of the input shaft 10 is divided into the ranges as described above, and the position of the first piston 42 is learned for each of the ranges thus set, so that the learning control is less likely or unlikely to be cumbersome and complicated, and the frequency at which the first piston 42 is driven can be reduced.

In the learning control as described above, the electronic control unit 49 is configured to learn the engagement start position by detecting the learning point 1 and the learning point 2. However, either one of these learning points may be set as the engagement start position. Also, the control unit according to this invention is only required to learn the engagement start position according to the rotational speed of one of the engaging elements of the clutch K0; therefore, the invention is not limited to the learning control shown in FIG. 3. Also, the invention is not limited to the example in which the control unit is configured to learn the engagement start position, based on two or more ranges of the rotational speed of the input shaft 10, which ranges are delimited by predetermined rotational speeds. For example, two or more engagement start positions may be learned with respect to different rotational speeds, respectively, and an approximated curb may be formed based on the engagement start positions learned for the respective rotational speeds, and the rotational speed, so that the position of the pressure plate 31 can be continuously changed. While the electronic control unit 49 is configured to learn the engagement start position by detecting the position of the first piston 42, in the example as described above, it is only required to detect the position of the pressure plate 31. Accordingly, a sensor for detecting the rotational angle of the motor 41 or the amount of movement of the pressure plate 31 may be provided, and the engagement start position may be learned according to a signal detected by the sensor.

Figure 8:
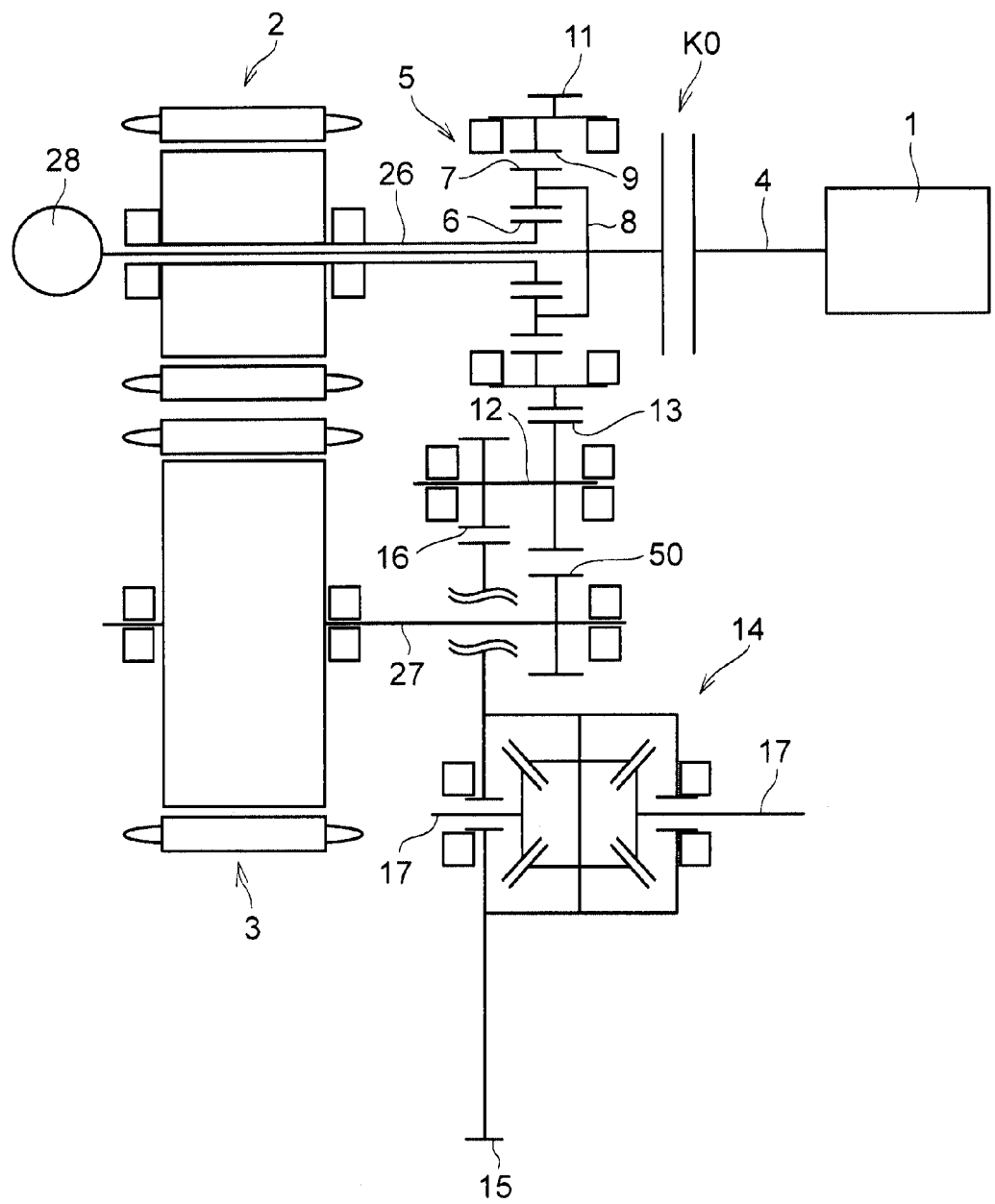
FIG. 8 is a skeleton diagram showing another example of vehicle including a clutch, in which the control system of the invention is used.

The invention is not limitedly applied to the vehicle as shown in FIG. 5, but may be applied to a vehicle in which the second motor-generator 3 is disposed in parallel with the input shaft 10, as shown in FIG. 8 by way of example. In the example shown in FIG. 8, a reduction gear 50 is coupled to the output shaft 27 of the second motor-generator 3, and the reduction gear 50 meshes with the counter driven gear 13. The other arrangement is similar to that of the example shown in FIG. 5. Further, the position of the clutch K0 is not limited to a position at which the clutch permits and inhibits transmission of torque between the output shaft 4 of the engine 1 and the input shaft 10, but may be a position at which the clutch permits and inhibits transmission of torque between the first motor-generator 2 and the sun gear 6, or a position at which the clutch permits and inhibits transmission of torque between the ring gear 9 and the output gear 11.

What is claimed is:

1. A control system for a clutch mechanism, the clutch mechanism including
a first engaging element, a second engaging element, and a piston, the first engaging element being configured to be moved in an axial direction by a hydraulic pressure developed according to change of a position of the piston, the second engaging element being opposed to the first engaging element in the axial direction and rotatable relative to the first engaging element, the first engaging element and the second engaging element being coupled to each other such that torque can be transmitted from the first engaging element to the second engaging element by contacting the first engaging element with the second engaging element,
the control system comprising
an electronic control unit configured to:
(i) learn an engagement start position, according to a rotational speed of one of the first engaging element and the second engaging element, the engagement start position being a position of the first engaging element at a time when the first engaging element and the second engaging element start contacting with each other; and (ii) divide the rotational speed of one of the first engaging element and the second engaging element into a plurality of ranges delimited by predetermined rotational speeds, and learn the engagement start position for each of the ranges.

2. The control system according to claim 1, wherein the electronic control unit is configured to learn the engagement start position again, after a predetermined period elapses since the engagement start position is learned.

* * * * *